(12) United States Patent
Drube et al.

(10) Patent No.: US 6,631,615 B2
(45) Date of Patent: Oct. 14, 2003

(54) STORAGE PRESSURE AND HEAT MANAGEMENT SYSTEM FOR BULK TRANSFERS OF CRYOGENIC LIQUIDS

(75) Inventors: Thomas K. Drube, Lakeville, MN (US); Claus Emmer, Prior Lake, MN (US)

(73) Assignee: Chart Inc., Burnsville, MN (US)

( * ) Notice: Subject to any disclaimer, the term of this patent is extended or adjusted under 35 U.S.C. 154(b) by 0 days.

(21) Appl. No.: 10/002,074

(22) Filed: Oct. 31, 2001

(65) Prior Publication Data

US 2002/0157402 A1 Oct. 31, 2002

Related U.S. Application Data

(63) Continuation-in-part of application No. 09/687,767, filed on Oct. 13, 2000, now Pat. No. 6,354,088.

(51) Int. Cl.[7] .................................................. F17C 9/02
(52) U.S. Cl. ........................................ 62/50.4; 62/53.2
(58) Field of Search ................................ 62/49.2, 50.1, 62/50.2, 50.4, 53.2

(56) References Cited

U.S. PATENT DOCUMENTS

| 3,633,372 | A | 1/1972 | Torrance |
|---|---|---|---|
| 3,946,572 | A | 3/1976 | Bragg |
| 5,107,906 | A | 4/1992 | Swenson et al. |
| 5,121,609 | A | 6/1992 | Cieslukowski |
| 5,127,230 | A | 7/1992 | Neeser et al. |
| 5,163,409 | A | 11/1992 | Gustafson et al. |
| 5,228,295 | A | 7/1993 | Gustafson |
| 5,231,838 | A | 8/1993 | Cieslukowski |
| 5,315,831 | A | 5/1994 | Goode et al. |
| 5,373,702 | A | 12/1994 | Kalet et al. |
| 5,409,046 | A | 4/1995 | Swenson et al. |
| 5,411,374 | A | 5/1995 | Gram |
| 5,421,160 | A | 6/1995 | Gustafson et al. |
| 5,421,162 | A | 6/1995 | Gustafson et al. |
| 5,537,824 | A | 7/1996 | Gustafson et al. |
| 5,682,750 | A | 11/1997 | Preston et al. |
| 5,687,776 | A | 11/1997 | Forgash et al. |
| 5,771,946 | A | 6/1998 | Kooy et al. |
| 5,771,948 | A | 6/1998 | Kountz et al. |
| 5,787,940 | A | 8/1998 | Bonn et al. |
| 5,868,176 | A | 2/1999 | Barajas et al. |
| 5,884,488 | A | 3/1999 | Gram et al. |
| 5,916,246 | A | 6/1999 | Viegas et al. |
| 5,954,101 | A | 9/1999 | Drube et al. |

Primary Examiner—Denise L. Esquivel
Assistant Examiner—Malik N. Drake
(74) Attorney, Agent, or Firm—Piper Rudnick (57) ABSTRACT

A system for transferring and conditioning a cryogenic liquid includes a replenishing tank containing a supply of cryogenic liquid, a bulk tank and a pump positioned there between. The pump causes a stream of the cryogenic liquid to flow from the replenishing tank to the bulk storage tank. A heat exchanger and parallel by-pass line are positioned between the pump and bulk storage tank. A flow control valve diverts a portion of the stream to the heat exchanger so that it is warmed and rejoined with the remaining cryogenic liquid flowing through the flow control valve. The warmed stream then flows to the bulk storage tank. The flow control valve is adjusted based upon pressures within the bulk storage tank via a pressure line in communication with the head space of the bulk storage tank and a pneumatic controller or a pressure sensor in the bulk tank head space and a programmable logic controller.

20 Claims, 9 Drawing Sheets

STORAGE PRESSURE AND HEAT MANAGEMENT SYSTEM FOR BULK TRANSFERS OF CRYOGENIC LIQUIDS

This application is a continuation-in-part of U.S. patent application Ser. No. 09/687,767, filed Oct. 13, 2000 is now 6,354,088.

BACKGROUND OF THE INVENTION

The invention relates generally to cryogenic fluid dispensing systems and, more particularly, to a system for heating cryogenic liquid during transfer to a dispensing system bulk storage tank based upon the pressure within the bulk storage tank.

Current alternative fuels include cryogenic substances such as Liquified Natural Gas (LNG). Cryogenic substances have a boiling point generally below −150° C. A use device, such as an LNG-powered vehicle, may need to store LNG in an on-board fuel tank with a pressure head that is adequate for the vehicle engine demands. That is, the LNG can be stored in a saturated state on board the vehicle in order to maintain the desired pressure while the vehicle is in motion. This saturation generally occurs by heating the LNG prior to its introduction into the vehicle tank.

LNG is typically dispensed from a bulk storage tank to a vehicle tank by a pressurized transfer. This may be accomplished through the use of a pump, pressurized transfer vessels or a straight pressure transfer from the bulk storage tank at a higher pressure to a vehicle tank at a lower pressure.

A common method of saturating cryogenic liquids, such as LNG, is to saturate the LNG as it is stored in a conditioning tank of a dispensing station. In some instances, the conditioning tank may also be the bulk storage tank of the dispensing station. The LNG may be heated to the desired saturation temperature and pressure by removing LNG from the conditioning tank, warming it, and reintroducing it back into the conditioning tank. The LNG may be warmed, for example, by heat exchangers as illustrated in U.S. Pat. Nos. 5,121,609 and 5,231,838, both to Cieslukowski, and 5,682,750 to Preston et al. Alternatively, the LNG may be heated to the desired saturation temperature and pressure through the introduction of warmed cryogenic gas into the conditioning tank. Such an approach is illustrated in U.S. Pat. Nos. 5,421,160, 5,421,162 and 5,537,824, all to Gustafson et al.

A disadvantage of such re-circulation or warmed gas arrangements, however, is that when a single interim or the bulk tank is used as the conditioning tank, continuous dispensing of saturated LNG is not possible. More specifically, saturated LNG is not available for dispensing during refill of the conditioning tank and while the newly added LNG in the conditioning tank is being conditioned. As a result, saturated LNG may not be available for dispensing for significant periods of time.

While the above difficulties may be overcome by providing a pair of interim dispensing station transfer or conditioning tanks, such a system has to be tailored in dimensions and capacities to specific site conditions, that is, the amount of fills, pressures expected, etc. As a result, deviations from the design conditions still results in problems for such a system.

Saturating LNG in a conditioning tank by re-circulation or warmed gas is also not optimal in terms of time efficiency. Transferring the LNG from a transport, such as a tanker truck, to the bulk storage tank takes an extended pumping time. After the transfer is complete, and the bulk storage tank has been refilled, conditioning of the transferred LNG must occur which takes an additional period of time. Time efficiency would be improved if the conditioning occurred during the transfer of LNG to the bulk tank.

Another approach for saturating the LNG prior to delivery to the vehicle tank is to warm the liquid as it is transferred to the vehicle tank. Such an approach is known in the art as "Saturation on the Fly" and is illustrated in U.S. Pat. No. 5,787,940 to Bonn et al. wherein heating elements are provided to heat the LNG as it is dispensed. U.S. Pat. Nos. 5,687,776 to Forgash et al. and 5,771,946 to Kooy et al. also illustrate dispensing systems that use heat exchangers to warm cryogenic liquid fuel as it is transferred to a vehicle. While such prior art "Saturation on the Fly" systems remove the difficulties associated with saturating the dispensing station vessel, they can be complex and, as a result, more costly. The additional components may also have additional maintenance needs.

Figure 1:
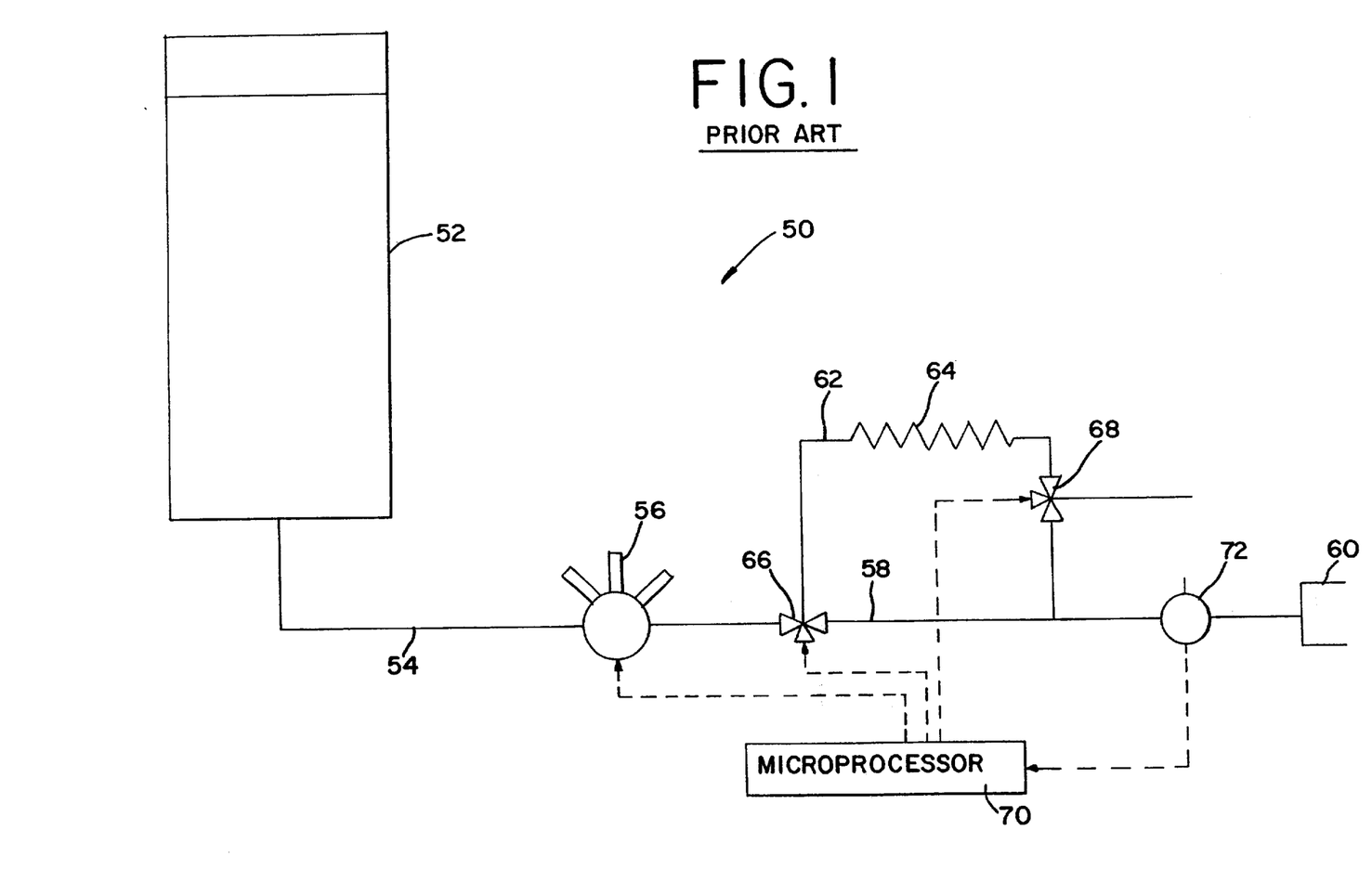
FIG. 1 is a schematic of a prior art dispensing system.

U.S. Pat. No. 5,373,702 to Kalet et al. presents an LNG delivery system, indicated in general at 50 in FIG. 1, whereby a vehicle fuel tank is initially filled with unheated LNG from a storage tank 52 via lines 54 and 58, pump 56 and coupling 60 to purposely collapse the vapor head therein. The vehicle fuel tank features a spray head positioned in its vapor space through which the LNG from the delivery system flows. The liquid dispensing line 58 includes a pressure sensor 72 which provides an indication to a microprocessor 70 when the liquid level in the vehicle tank reaches the spray head. The microprocessor then manipulates valves 66 and 68 so that LNG is routed through line 62 and a heat exchanger 64. As a result, natural gas vapor is produced and delivered to the vehicle fuel tank so that the LNG therein is saturated. The vehicle includes an overflow tank which receives LNG that is displaced from the vehicle fuel tank as the natural gas vapor is added and saturation occurs. A disadvantage of such an arrangement, however, is the requirement that the vehicle include an overflow tank. This adds to the vehicle cost, weight and complexity.

Accordingly, it is an object of the present invention to provide a system enables continuous dispensing of cryogen.

It is another object of the present invention to provide a system that conditions cryogen without the need for recirculating the cryogen from a conditioning tank.

It is another object of the present invention to provide a system that conditions cryogen without the need for dual conditioning tanks.

It is still another object of the present invention to provide a system that heats cryogenic liquid as it is transferred to a storage tank.

It is still another object of the present invention to provide a system that heats cryogenic liquid as it is being transferred based upon the pressure in the destination tank.

These and other objects and advantages will be apparent from the following specification.

SUMMARY OF THE INVENTION

A system constructed in accordance with the present invention dispenses cryogenic liquid to a use device tank from a bulk storage tank containing a supply of cryogenic liquid. A dispensing line is in communication with the bulk storage tank and is adapted to communicate with the use device tank. A pump and heater are in circuit with the dispensing line. A system control device, such as a microprocessor, is in communication with the pump and heater so that cryogenic liquid may be dispensed, and selectively heated as it is dispensed, to the use device tank.

A liquid level sensor and a pressure or temperature sensor communicate with the use device tank and the system control device so that the liquid level and temperature or pressure of cryogenic liquid initially in the use device tank may be determined. The system control device uses this information to calculate the amount of heat and cryogenic liquid that must be added to the use device tank to optimally fill the use device tank. The system control device then operates the heater and pump to fill the use device tank with cryogenic liquid saturated as required. Unheated cryogenic liquid is preferably initially added to the use device tank so that the vapor head therein is collapsed. Heat may then be added to the cryogenic liquid stream as it is dispensed prior to the completion of the fill to saturate the liquid and rebuild pressure in the use device tank.

The system may alternatively include only a liquid level sensor in communication with the use device tank. The liquid initially in the use device tank is assumed to be saturated and at the pressure required by the use device when such an embodiment is selected.

The pump is preferably a positive displacement pump and is preferably submerged in cryogenic liquid housed in a sump. The heater may include a heat exchanger, electric heater, cryogenic gas or other heating arrangement.

An embodiment of the system of the present invention includes a replenishing tank or a transport tank containing a supply of cryogenic liquid, a bulk storage tank and a pump in circuit there between so that a stream of cryogenic liquid flows from the replenishing tank to the bulk storage tank when the pump is operated. The replenishing tank may be the tank of a delivery vehicle or a fixed transfer tank. A heat exchanger and a parallel by-pass line are in circuit between the pump and the bulk storage tank. A flow control valve is positioned within the by-pass line and is adjustable to direct a portion of the cryogenic liquid stream to the heat exchanger so that it is warmed and rejoined with a remaining portion of the stream passing through the by-pass line. The warmed stream then flows to the bulk storage tank.

A pneumatic controller senses pressures within the bulk storage tank via a pressure line that is in communication with the head space of the bulk storage tank. The pneumatic controller automatically adjusts the flow control valve based upon the pressures detected within the bulk storage tank so that the bulk storage tank is ultimately filled with saturated cryogenic liquid at the desired pressure.

An alternative embodiment of the system of the present invention omits the pressure line and the pneumatic controller and instead includes a pressure sensor in communication with the head space of said bulk storage tank and an actuator that automatically adjusts the flow control valve. A programmable controller is in communication with the pressure sensor and the actuator so that the latter automatically adjusts the flow control valve based upon the pressures detected within the bulk storage tank. As a result, the bulk storage tank is ultimately filled with saturated cryogenic liquid at the desired pressure. The programmable controller may also be in communication with the pump so as to adjust its operating speed based upon pressures detected within the bulk storage tank.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 2:
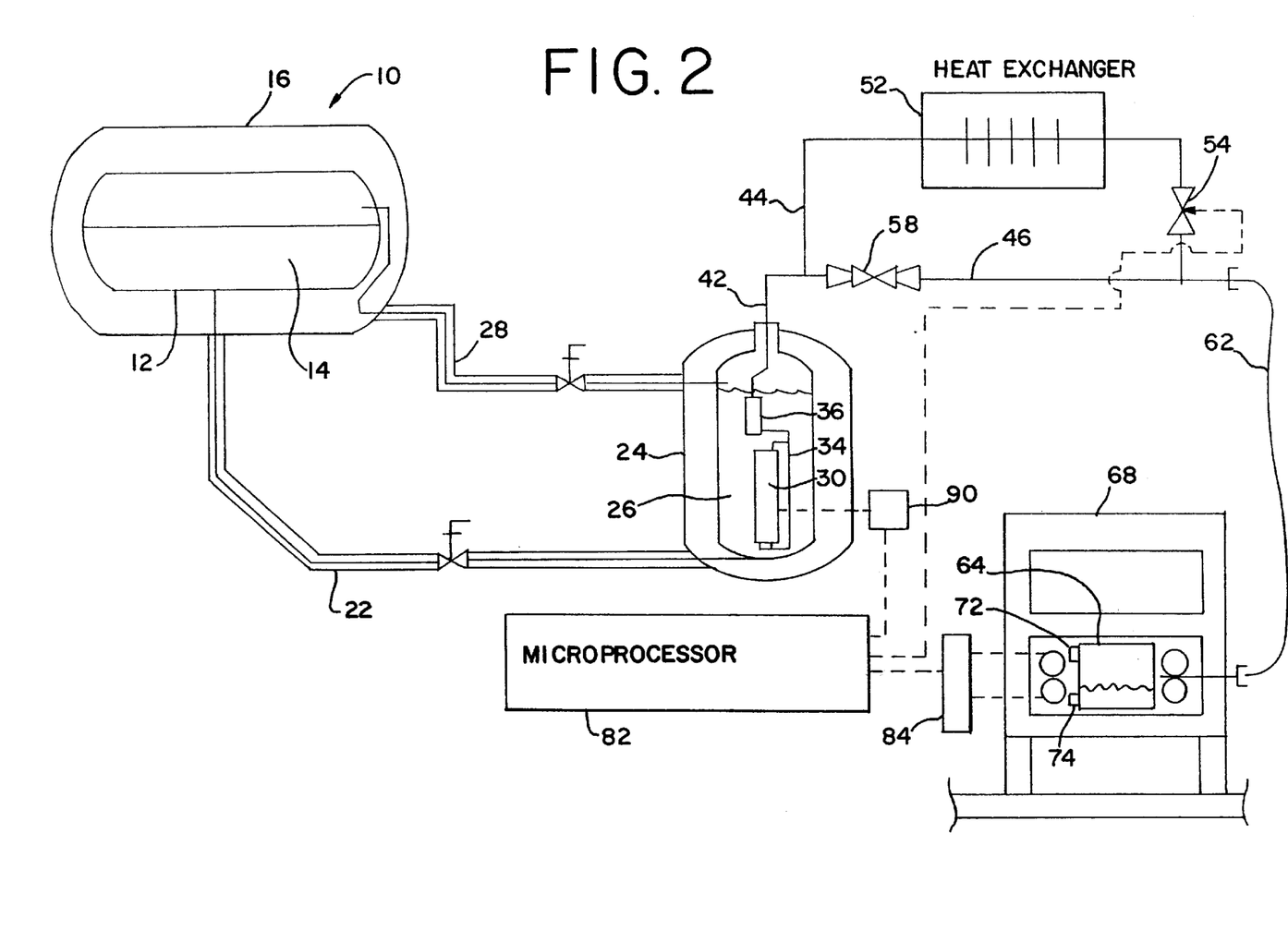
FIG. 2 is a schematic of a dispensing system constructed in accordance with the present invention.

With reference to FIG. 2, a dispensing system constructed in accordance with the present invention includes a bulk storage tank, indicated in general at 10. The bulk storage tank includes an inner tank 12 containing a supply of cryogenic liquid 14, such as Liquid Natural Gas (LNG). Examples of other cryogenic liquids which the invention can deliver include Liquid Oxygen, Liquid Nitrogen, Liquid Argon and Liquid Hydrogen. An outer jacket 16 surrounds the inner tank 12 and, as is known in the art, the space therebetween is generally evacuated to provide insulation.

LNG is provided via gravity and insulated feed line 22 to a sump tank 24. Sump 24 also features a double-walled construction so that the LNG 26 therein is insulated from ambient temperatures. An insulated vent or return line 28 is provided to vent excess gas from sump 24 to bulk storage tank 10. The insulation of line 28 minimizes heat transfer.

A pump 30 is positioned within sump 24 and is submerged within the LNG 26 so that no cool-down period is required when pumping is to commence. Pumped LNG travels through line 34 into a meter 36 which is also submerged in the LNG. The submersion of the meter in the LNG allows for accurate metering without a cool-down period when pumping commences. Flow measurement arrangements such as pump stroke counters may be used as alternatives to flow meter 36.

Pumped LNG travels out of sump 24 via line 42 and to lines 44 and 46. LNG traveling through line 44 passes through heat exchanger 52 and valve 54. The setting of valve 54 determines the portion of LNG that passes through line 44. A venturi 58 is positioned in line 46 to force a portion of the liquid into line 44 when valve 54 is at least partially open. LNG passing through line 44 and heat exchanger 52 is warmed and rejoins the LNG flowing through line 46 for dispensing via hose 62 to the fuel tank 64 of a use device such as a bus, truck or other vehicle 68.

Vehicle fuel tank 64 is equipped with an optional pressure sensor 72 and a liquid level sensor 74. A temperature sensor may be substituted for pressure sensor 72 or the vehicle tank may be equipped solely with a liquid level sensor. Sensors 72 and 74 communicate via electrical interface 84 with a microprocessor 82 that is co-located with the dispensing system. Alternatively, if a pressure sensor is used, the sensor could be mounted in the dispensing apparatus for measuring the tank pressure prior to commencing a dispensing operation. It should be understood that while a microprocessor is described, numerous types of system control devices known in the art could be substituted in the dispensing system of the present invention. Interface 84 may permit the data from sensors 72 and 74 to be transmitted to microprocessor 82 in a number of ways including, but not limited to, infrared, radio, detachable electrical connections or pneumatic signals. The total capacity of vehicle tank 64 and the operating pressure required by the engine of the vehicle 68 is entered into microprocessor 82 via manual entry or transmission along with the data from sensors 72 and 74. Typical operating pressures for vehicles range from approximately 70 psi to 120 psi and a temperature range from approximately −211° F. to −194° F.

Once the microprocessor 82 has received the vehicle tank capacity, operating pressure requirement, current liquid level in the vehicle tank and either current temperature or pressure in the vehicle tank, it will calculate the amount of LNG and heat that must be added to optimally fill the tank while maintaining the operating pressure of the vehicle engine. The microprocessor may alternatively perform the calculation solely from the vehicle tank capacity, operating pressure requirement and current liquid level in the vehicle tank data by assuming that the liquid remaining in the vehicle tank prior to refill is at the desired saturation pressure.

If the vehicle fuel tank includes a temperature or pressure sensor, the following equation may be utilized to calculate the amount of LNG that must be added to the vehicle tank and the amount of heat that must be added to this LNG as it is dispensed to obtain the optimum final temperature:

Volume of liquid to add=$(V*\rho(P_{sat})-M(LL))/(\rho(P_{stored}))$

Heat to add=$(h_f(P_{measured})-h_f(P_{stored}))*(V*\rho(P_{sat})-M(LL))+M(LL)*(h_f(P_{sat})-h_f(P_{measured}))$ Where:
  V is the volume of the vehicle tank
  M(LL) is the mass of natural gas in the tank as determined by the level data
  $P_{sat}$ the desired saturation pressure
  $P_{stored}$ is the current saturation pressure of the fuel to be delivered
  $P_{measured}$ is the pressure measured in the vehicle tank prior to refill
  $\rho(X)$ is the density of LNG at the desired saturation pressure
  $h_f(X)$ is the specific enthalpy of the liquid at the specified pressure ($P_{measured}$, $P_{sat}$ or $P_{stored}$)

As illustrated above, $P_{measured}$ is used when a pressure sensor is present. $P_{measured}$ is replaced with $T_{measured}$ when a temperature sensor is used in place of the pressure sensor.

If the vehicle fuel tank includes only a liquid level sensor (no pressure or temperature sensor for the vehicle tank), the following equations may be utilized to calculate the amount of LNG that must be added to the vehicle tank and the amount of heat that must be added to this LNG as it is dispensed to obtain the optimum results. In this case, the residual fuel in the tank prior to refill is assumed to be at the desired saturation level:

Volume of liquid to add=$(V*\rho(P_{sat})-M(LL))/(\rho(P_{stored}))$

Heat to add=$(h_f(P_{sat})-(P_{stored}))*(V*\rho(P_{sat})-M(LL))$

Where:
  V is the volume of the vehicle tank
  M(LL) is the mass of natural gas in the tank as determined by the level data
  $P_{sat}$ is the desired saturation pressure
  $P_{stored}$ is the current saturation pressure of the fuel to be delivered
  $\rho(X)$ is the density of LNG at the desired saturation pressure
  $h_f(X)$ is the specific enthalpy of the liquid at the specified pressure ($P_{sat}$ or $P_{stored}$)

Microprocessor 82 controls valve 54 and a pump controller 90 so that the amount of LNG dispensed to the vehicle fuel tank and the amount of heat added thereto via heat exchanger 52 may be controlled as dictated by the above calculations.

The dispensing of the LNG and addition of heat may be accomplished in stages. More specifically, unheated, and therefore very cold, LNG is preferably initially dispensed to the vehicle fuel tank so that the vapor head therein is collapsed. As a result, the temperature and pressure of the vehicle tank are lowered rapidly at the beginning of the fill so that the pressure demands placed upon pump 30 and the fill time are minimized. Heat may then be added to the stream of LNG, via heat exchanger 52, as it is dispensed prior to the completion of the fill such that the LNG in the fuel tank reaches the saturation temperature to recreate the required operating pressure when the fill is completed. Microprocessor 82 must therefore also calculate the quantity of heat required and duration of heating that is to occur as the LNG is dispensed. Optimally, at the completion of the fill, the LNG in the fuel tank would be exactly at the lowest saturation temperature required for the operating pressure of the vehicle. In embodiments where the vehicle tank includes a temperature sensor, the microprocessor 82 may optionally monitor the temperature of the LNG in the vehicle tank so that when the temperature of the LNG in the tank drops below a predetermined level, heat is added to the LNG being dispensed.

Figure 3:
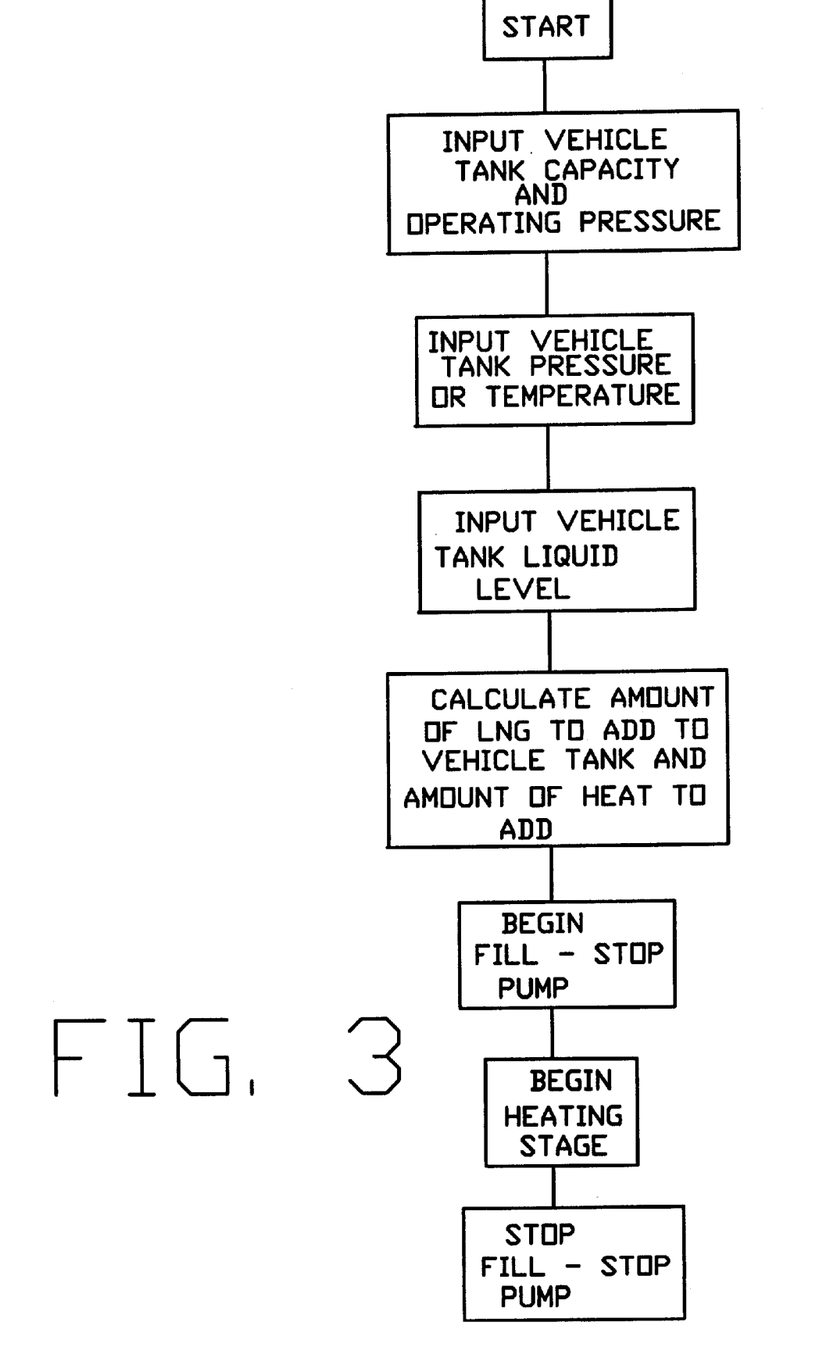
FIG. 3 is a flow chart illustrating the logic performed by the microprocessor of FIG. 2.

FIG. 3 presents a flow chart illustrating an example of the logic for the microprocessor 82 whereby the system may perform the necessary calculations and then dispense and heat the LNG in stages as described above. Because microprocessor 82 receives inputs for the specific vehicle tank to be refilled, the system easily accommodates a variety of vehicles and initial tank conditions.

As an example of operation of the system of the invention, a situation is presented where the vehicle tank has a capacity of 100 gallons and is initially 50% full and the station has LNG stored at a pressure of 20 psig. If the initial pressure of the LNG in the vehicle tank is measured to be 110 psig (via a pressure sensor or derived from temperature sensor data), and the desired saturation pressure is 100 psig, 45.6 gallons of LNG and 4761 BTU's of heat would need to be added to the vehicle tank, according to the above equations. In the situation where there are no pressure or temperature sensors in communication with the vehicle tank, an assumption is made that the liquid initially in the vehicle tank (which is 50% full) is at the desired saturation pressure of 100 psig. Based upon the above equations, 45.6 gallons of LNG and 5217 BTU's of heat should be added to the vehicle tank. In both examples, unheated LNG would be initially delivered to the vehicle tank for a time period of 1 to 2 minutes with heating of the LNG occurring for the remainder of the fill.

Figure 4:
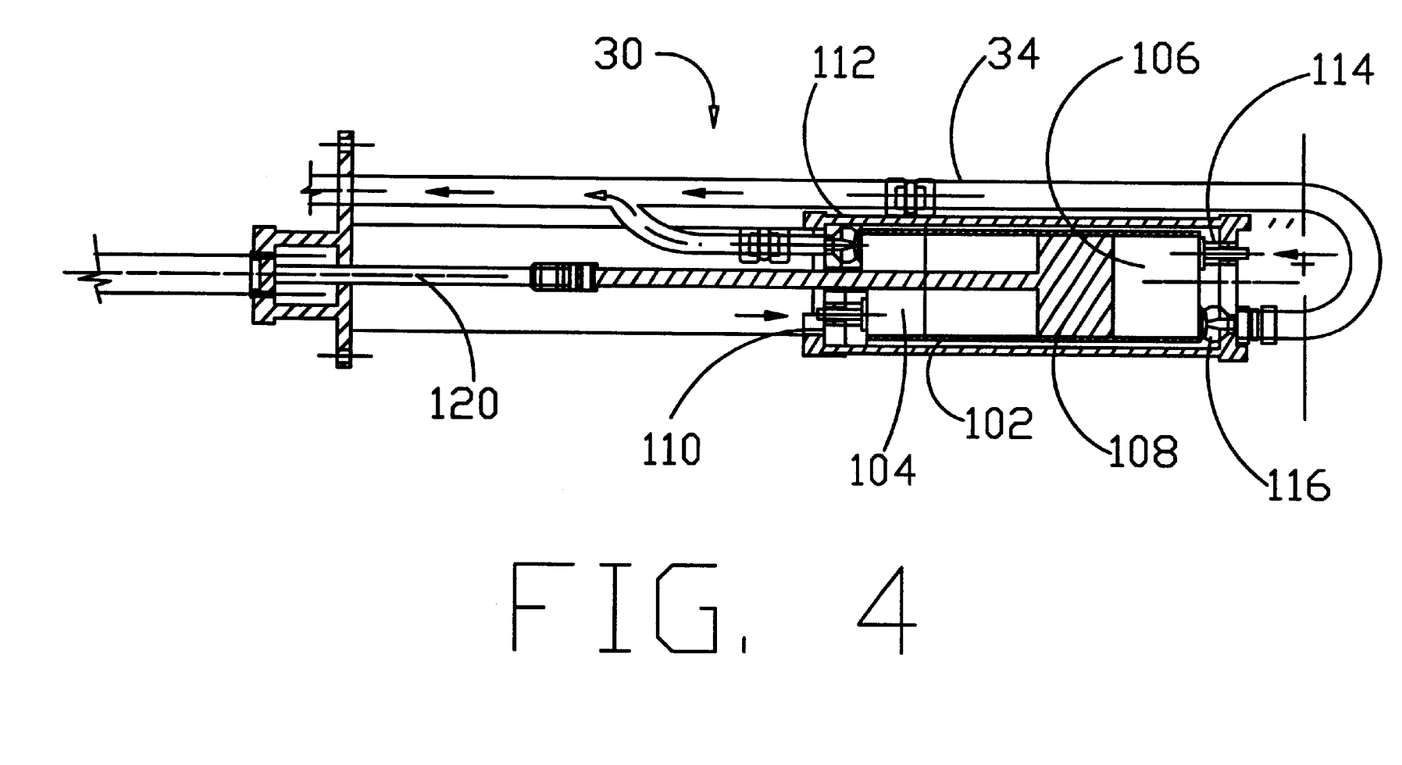
FIG. 4 is an enlarged sectional side elevation view of the pump of FIG. 2.

A positive displacement pump suitable for use with the dispensing system of FIG. 2 is indicated in general at 30 in FIG. 4. The positive displacement pump 30 includes a cylinder housing 102 which contains a pumping cylinder that is divided into a pair of pumping chambers 104 and 106 by a sliding piston 108. Pumping chamber 104 includes inlet check valve 110 and outlet check valve 112. Similarly, chamber 106 includes inlet check valve 114 and outlet check valve 116.

In operation, LNG from sump 24 (FIG. 2) enters and is discharged from the pump chambers 104 and 106 during alternating intake and discharge strokes of piston 108. More specifically, as the piston 108 moves to the right in FIG. 3, LNG is drawn into chamber 104 through inlet check valve 110 while LNG is simultaneously discharged from chamber 106 through outlet check valve 116. When the piston 108 moves to the left in FIG. 3, LNG is drawn into chamber 106 through check valve 114 and discharged from chamber 104 through check valve 112. Pumped LNG travels through common line 34 to meter 36 (FIG. 2).

Piston 108 is connected by a rod 120 to a hydraulic system, an electric motor or some other variable speed device that moves the piston in the cylinder. As a result, the number of strokes per minute of the piston may be adjusted so that the pump may produce a variety of flow rates. The pressure output of the pump may be increased by increasing the power delivered to the piston 108. While a positive displacement pump is preferred in the dispensing system of the invention, it should be understood that a centrifugal pump could also be used. Such a centrifugal pump would need to include suitable pressure controls.

Figure 5:
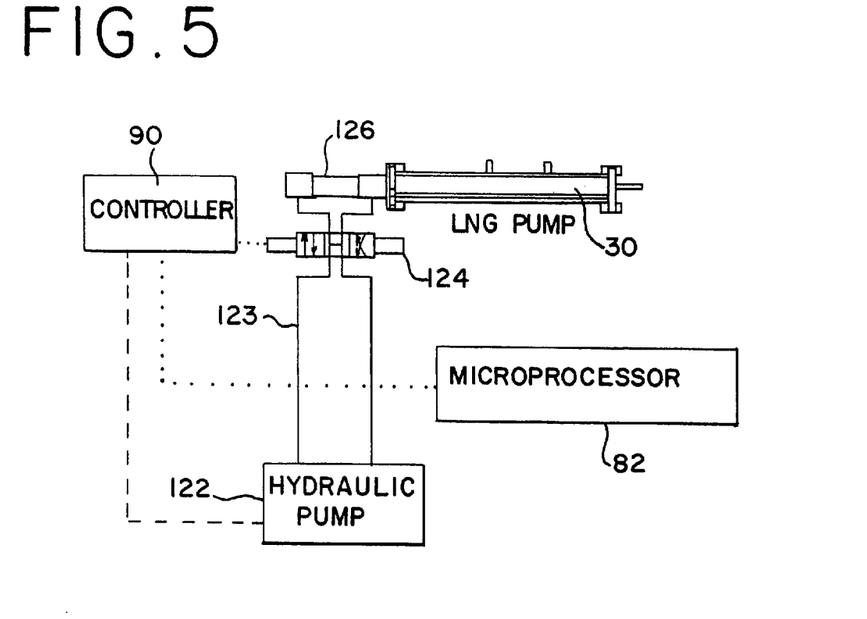
FIG. 5 is a schematic view of a system for powering the pump of FIG. 4.

An example of a hydraulic system suitable for driving the piston of the pump 30 is illustrated in FIG. 5. A hydraulic pump provides hydraulic fluid in an alternating fashion via lines 123 and automated valves 124 to opposite sides of a drive piston (not shown) enclosed in drive housing 126. As a result, the drive piston, which is connected to the rod 120 of FIG. 4, reciprocates so as to drive the piston 108 (FIG. 4) of pump 30. As described above, microprocessor 82 communicates with pump controller 90 to control the pressure and flow rate produced by the pump 30. The controller 90 communicates with the automated valves 124 and the hydraulic pump 122 to accomplish this function.

Figure 6:
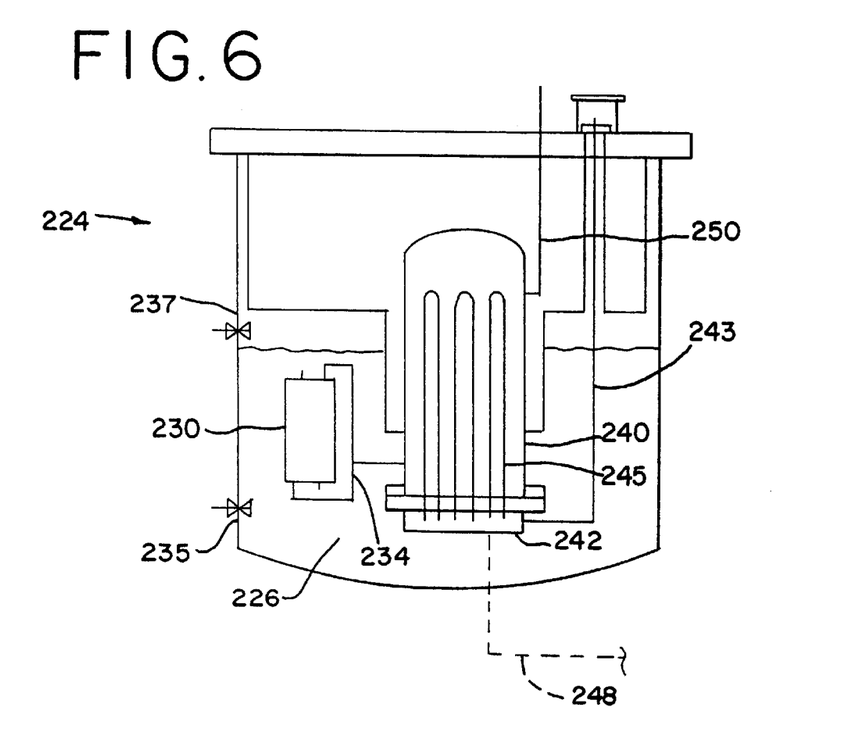
FIG. 6 is a sectional side elevation view of the sump of an alternative version of the dispensing system of FIG. 1.

The sump of an alternative version of the dispensing system of FIG. 2 is illustrated in general at 224 in FIG. 6. In this alternative version, an electrical heater is used in place of the heat exchanger 52 of FIG. 2 to heat the LNG as it is dispensed. The insulated feed line 22 of FIG. 2 leading from the LNG bulk storage tank connects to the sump 224 via valve 235 while the insulated vent line 28 communicating with the head space of the bulk storage tank connects to the sump via valve 237.

The pump 230, which may be of the type illustrated in FIGS. 3 and 4, is submerged in the LNG 226 in the sump and supplies LNG to a heater 240 via line 234. The heater 240 includes an electric immersion preheater 242 and heating elements 245 that receive power through electrical line 243. As a result, the heater 240, which is controlled via connection 248 by the system microprocessor (82 in FIG. 2), supplies the desired amount of heat to the LNG pumped out of the sump and into the vehicle fuel tank through line 250. It is to be understood that as an alternative to the arrangement illustrated, an electric heater may be positioned outside of the sump in association with line 250.

Figure 7:
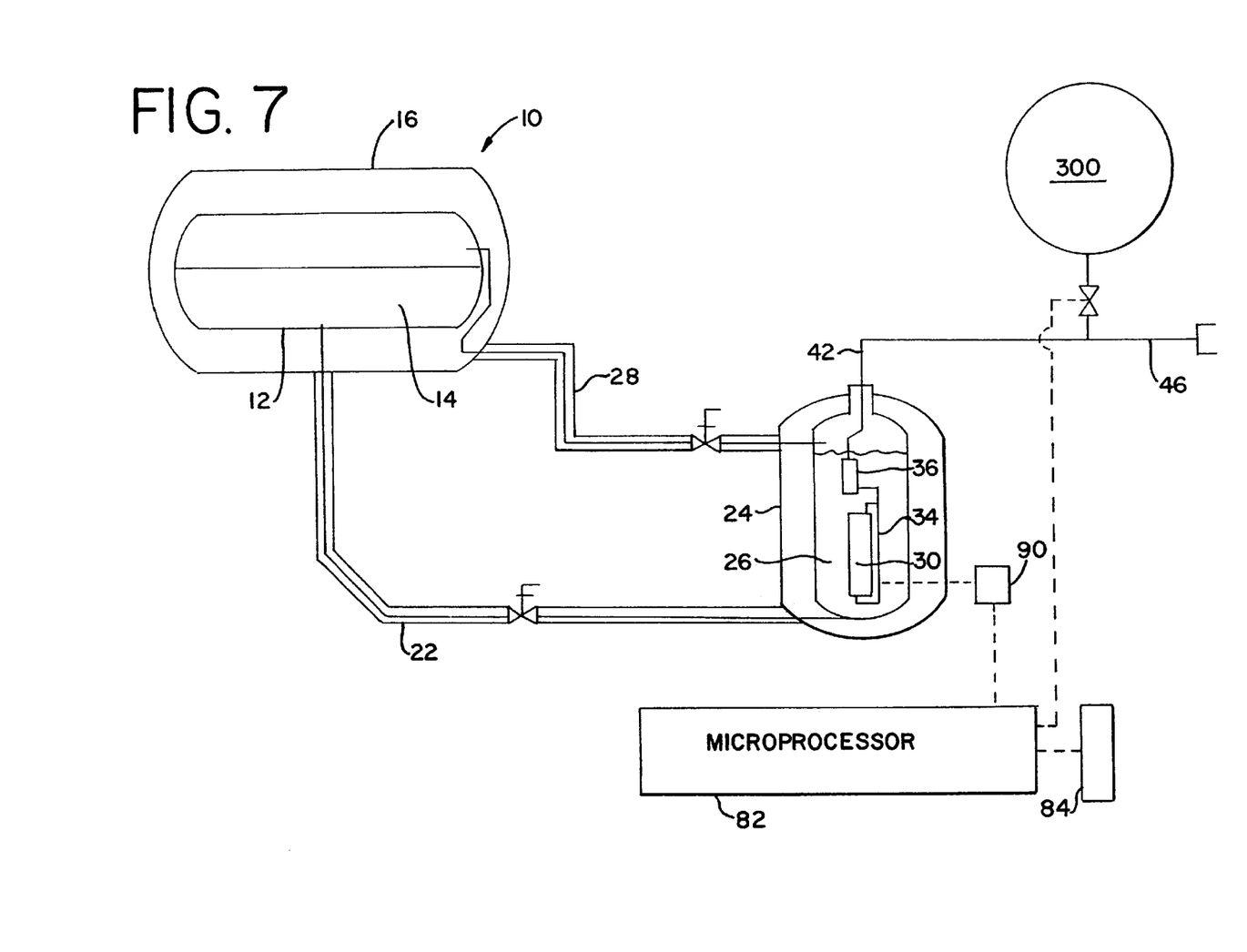
FIG. 7 is a schematic view of a second alternative version of the dispensing system of FIG. 1.

Another version of the dispensing system of FIG. 2 is illustrated in FIG. 7 where components shared with the embodiment of FIG. 2 are indicated with common reference numbers. In FIG. 7, a high pressure supply of natural gas at ambient temperature 300 is substituted for the heat exchanger 52 and line 44 of FIG. 2 and selectively communicates with dispensing line 46 via valve 302. Valve 302 is controlled via microprocessor 82 and the natural gas introduced thereby is recondensed within the liquid flowing through line 46. The resulting temperature increase in the liquid is proportional to the amount of gas recondensed.

Figure 8:
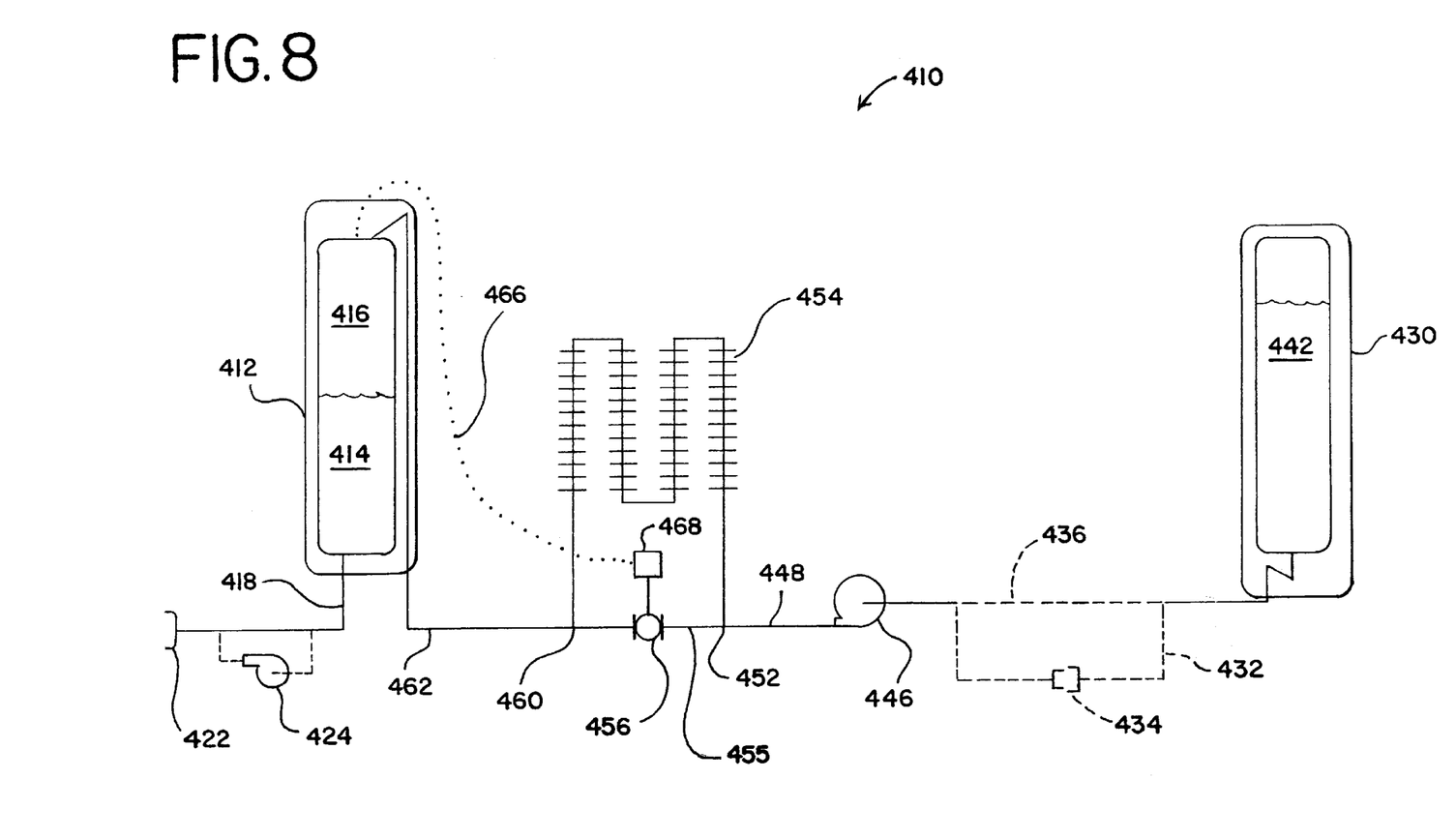
FIG. 8 is a schematic of an embodiment of the system of the present invention.

FIG. 8 illustrates an embodiment of the system of the present invention whereby a bulk of a cryogenic liquid, such as LNG, is warmed as it is transferred from replenishing tank, which may be a fixed transfer tank or transport/delivery truck tank, to a bulk storage tank. The system of FIG. 8, indicated in general at 410, features a jacketed bulk storage tank 412 containing a supply of LNG 414 with a head space 416 above. A dispensing line 418 communicates with the bottom/liquid side of the bulk tank so that LNG may be dispensed through coupling 422 to a use device, such as a vehicle, via gravity, pressure differential or pump 424. As will be explained below, the LNG 414 in bulk tank 412 has been conditioned or warmed to the saturation temperature for the pressure required by the use device to which it is dispensed.

The supply of LNG 414 within bulk tank 412 must be periodically replenished. This may be accomplished through delivery of LNG to the system by a delivery truck having a jacketed replenishing tank 430 with delivery line 432 and coupling 434. Alternatively, replenishing tank 430 may be a transfer tank that provides low pressure storage of LNG for the system 410 and is itself replenished by a delivery truck. In such a configuration, tank 430 would be fixed and connected to the remaining portion of the system through line 436. Regardless of whether it is the tank of a delivery truck or a transfer tank, however, tank 430 contains a supply of LNG 442 at a pressure of approximately 30 psi.

The LNG 442 within tank 430 is transferred by pump 446 to the bulk storage tank 412. More specifically, upon actuation of pump 446, LNG 442 from tank 430 travels through line 436, or, depending upon the configuration of tank 430, through line 432 and coupling 434, to pump 446. The LNG then exits pump 446 and travels through line 448 to junction 452.

Upon encountering junction 452, a portion of the LNG travels through ambient air heat exchanger 454 where it is heated. The remaining portion of LNG continues through by-pass line 455 and flow control valve 456. LNG exiting flow control valve 456 mixes with the heated LNG from heat exchanger 454 at junction 460. The resulting warmed LNG then travels to the head space 416 of bulk tank 412 via line 462 so that the bulk tank is refilled with LNG.

The setting of flow control valve 456 thus determines the portion of LNG that is heated and thus, the degree to which the LNG entering bulk tank 412 through line 462 is heated. That is, as the flow control valve 456 closes and restricts the flow of LNG therethrough, more LNG is diverted to the heat exchanger 454 so that greater heating of the LNG delivered to bulk tank 412 occurs.

The setting of control valve 456 is dictated by the conditions within bulk tank 412. More specifically, a pressure line 466 is in communication between the head space 416 of tank 412 and a pneumatic controller 468 that operates flow control valve 456. As a result, the pneumatic controller constantly senses the pressure within the bulk tank 412 and adjusts the setting of flow control valve 456. The pneumatic controller is calibrated so that if the pressure within the bulk tank 412 is below the desired pressure (the pressure required by the use device or slightly there above), the restriction exerted by flow control valve 456 automatically increases so that more LNG is heated and the stream of LNG entering the bulk tank is heated to a greater degree. This results in a pressure increase within bulk tank 412. If the pressure within bulk tank 412 is above the desired pressure, however, the flow restriction exerted by flow control valve 456 is reduced so that less LNG is heated and the stream of LNG entering bulk tank 412 is heated to a lesser degree. This results in a pressure decrease within bulk tank 412. As a result, the bulk tank 412 is ultimately filled with saturated LNG at the pressure required by the use device to which it is to be dispensed.

The system of FIG. 8 thus simultaneously supplies and conditions LNG for the bulk tank 412. This allows continuous dispensing of saturated/conditioned LNG from dispensing line 418 to use devices. The system of FIG. 8 also offers totally pneumatic operation which offers significant safety advantages in hazardous (flammable) environments. If tank 430 of FIG. 8 is configured as a transfer tank, the system 410 offers the additional advantages of on-site, low pressure storage. These advantages include longer hold times, and thus fewer refills, and facilitated refills of the transfer tank from a delivery truck.

Figure 9:
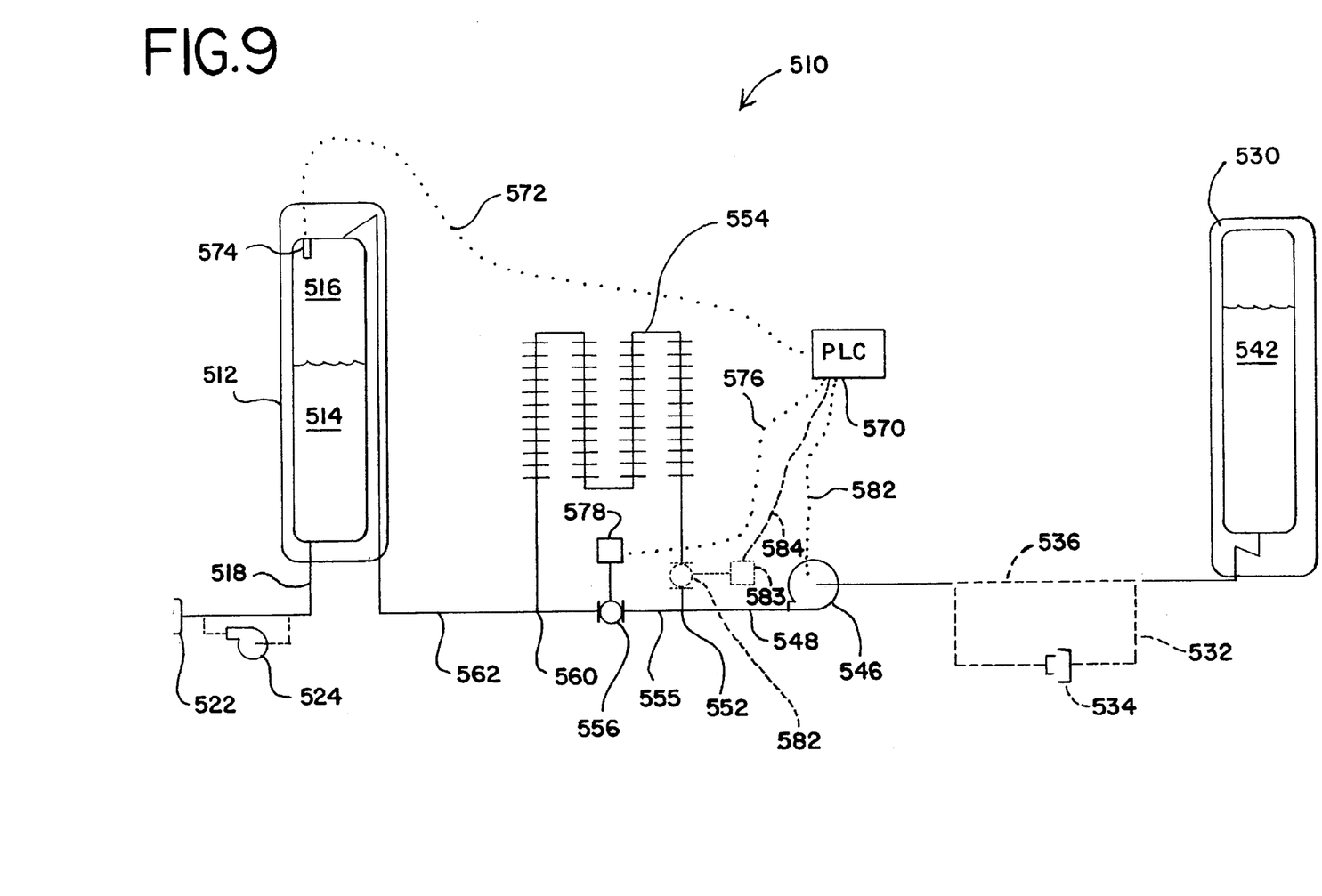
FIG. 9 is a schematic of a second embodiment of the system of the present invention.

An alternative embodiment of the system of the present invention is indicated in general at 510 in FIG. 9. Like the system of FIG. 8, the system 510 includes a bulk tank 512, containing a supply of LNG 514 with a head space 516, and a dispensing line 518 that provides LNG, via pressure differential, gravity or pump 524, to coupling 522. The system 510 of FIG. 9 also features a jacketed replenishing tank 530 containing LNG 542 that may be the tank of a delivery truck, which connects to the system via delivery line 532 and coupling 534, or a transfer tank that is fixed and connected to the system via line 536. The bulk tank 512 of FIG. 9 receives warmed LNG via line 562 after LNG from pump 546 encounters junction 552 and portions of the stream travel through heat exchanger 554 and by-pass line 555 (including valve 556) and are later rejoined.

The system 510 of FIG. 9 differs from the system 410 of FIG. 8, however, in that the direct pneumatic control system for the flow control valve of the latter has been replaced with a control system directed by a programmable logic controller 570. As illustrated in FIG. 9, controller 570 communicates via line 572 with a pressure sensor 574 positioned within the head space 516 of bulk tank 512. Controller 570 also communicates via line 576 with the automatic actuator 578 of automatic flow control valve 556 and line 582 with pump 546.

Figure 10:
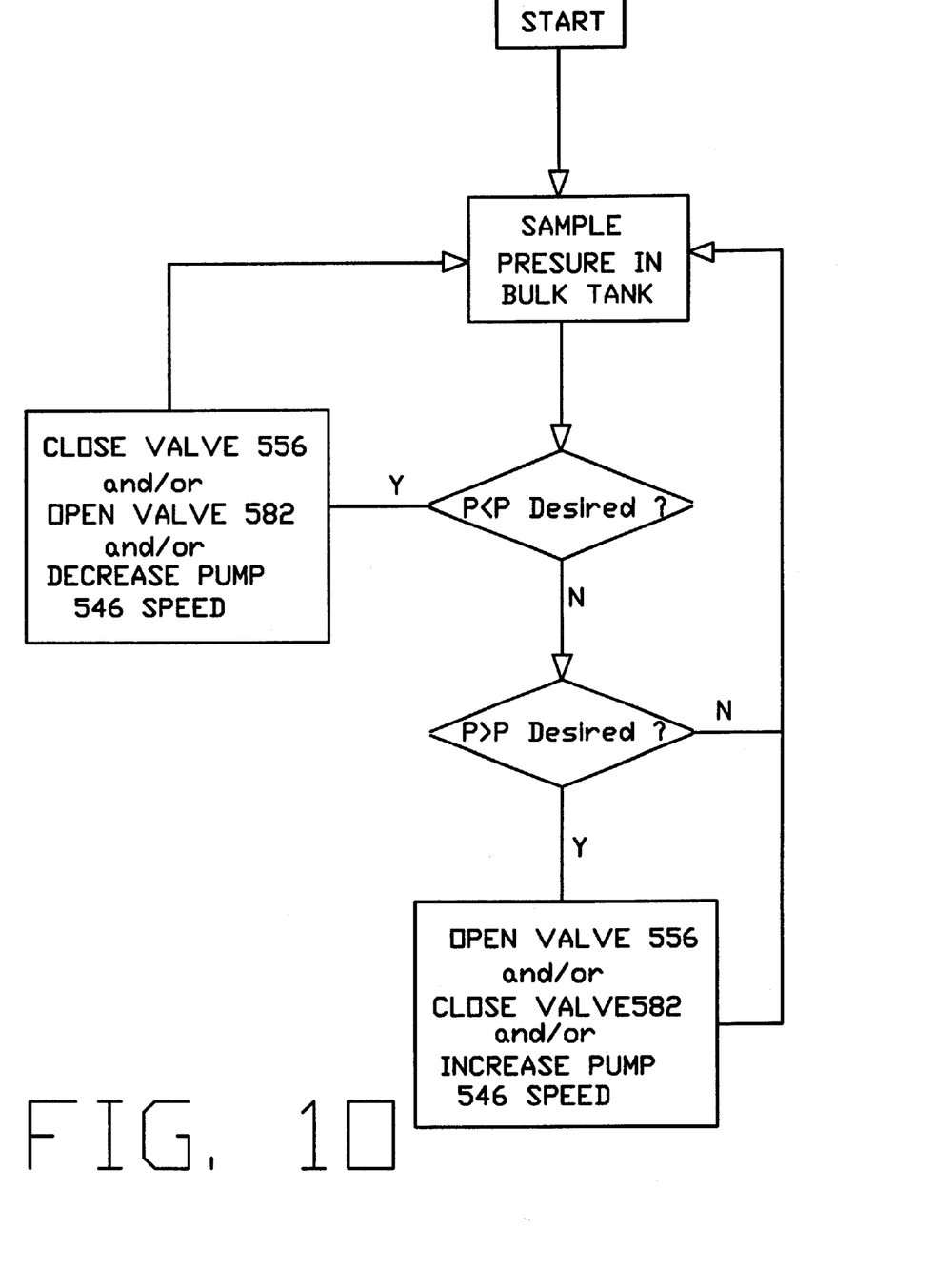
FIG. 10 is a flow chart illustrating the logic performed by the microprocessor of FIG. 9.

Controller 570 automatically adjusts the settings of flow control valve 556 and pump 546 based upon the pressure within the head space of bulk tank 512. As illustrated in FIG. 10, controller 70 samples the pressure within the head space of bulk tank 512 (FIG. 9). The sampling rate of controller 70 is preferably around ten samples per minute. As with the system of FIG. 8, if the pressure within the bulk tank 512 is below the desired pressure (the pressure required by the use device or slightly there above), controller 570 is programmed to adjust flow control valve 556 so that the resistance to the flow of LNG therethrough is increased so that more LNG is vaporized in heat exchanger 554 and rejoined with the stream exiting the valve at junction 560. If the pressure within the bulk tank 512 is above the desired pressure, flow control valve 556 is automatically adjusted so that the resistance to the flow of LNG therethrough is decreased and less LNG is vaporized.

The control of pump 546, however, provides the system of FIG. 9 with greater flexibility than the system of FIG. 8. A decrease in the speed of pump 546 amplifies the effect of the setting of flow control valve 556. That is, as the speed of pump 564 decreases, the LNG takes longer to flow through the heat exchanger 554 so that more heat is absorbed by the LNG. The opposite is true if the pump speed is increased. As such, and as illustrated in FIG. 10, the degree of heating of the LNG delivered to the bulk tank may be controlled to an extent by regulating the speed of pump 546 in combination with adjusting flow control valve 556 or while the setting of flow control valve 556 remains fixed.

In addition, controller 570 may be programmed to provide rapid pressure adjustments or slower pressure adjustments via the control of pump 546 and valve 556. By increasing the speed of pump 546, the flow rate of LNG through heat exchanger 554 is increased, thus decreasing the rate of heating of the LNG that is ultimately provided to the bulk tank 512, so that the temperature, and thus pressure, of the LNG within the bulk tank is less rapidly increased. Conversely, the pump may be slowed to provide a higher rate of increase of the pressure and temperature of the LNG within bulk tank 512.

The heating provided by system of FIG. 9 may be further adjusted or "fine-tuned" by the addition of automatic flow control valve 582, which is positioned between junction 552 and heat exchanger 554. Similar to flow control valve 556, valve 582 communicates by its actuating portion 583 and line 584 with controller 570. An increase in the flow resistance provided by valve 582 decreases the amount of LNG that is vaporized, while an increase in flow resistance provides an opposite response. As illustrated in FIG. 10, valve 582 may be adjusted in conjunction with control valve 556 and the speed of pump 546 by controller 570 to achieve the desired heating level and delivery speed for the LNG being delivered to bulk tank 12.

While FIGS. 8 and 9 were discussed in terms of ambient air heat exchangers, 454 and 554, respectively, it is to be understood that other types of heating arrangements may be used. These may include, for example, water-bath heat exchangers or electric heat exchangers.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for transferring and conditioning cryogenic liquid comprising:
  a) a replenishing tank containing a supply of cryogenic liquid;
  b) a bulk storage tank;
  c) a pump in circuit between said replenishing and bulk storage tanks so that a stream of cryogenic liquid flows from the replenishing tank to the bull storage tank when the pump is operated;
  d) a heat exchanger in circuit between said replenishing and bulk storage tanks;
  e) a by-pass line in circuit between said replenishing and bulk storage tanks and in parallel with said heat exchanger;
  f) a flow control valve in communication with said by-pass line and said heat exchanger, said flow control valve adjustable to direct a portion of the cryogenic liquid stream to the heat exchanger so that it is warmer and rejoined with a remaining portion of the stream passing through the by-pass line;
  g) means for detecting pressures within said bulk tank, said means for detecting pressure in communication with the flow control valve; and h) means for automatically adjusting said flow control valve, said means for automatically adjusting the flow control valve in communication with the means for detecting pressures and the flow control valve so that said flow control valve is adjusted based upon the pressures detected within said bulk storage tank so that said bulk storage tank is ultimately filled with saturated cryogenic liquid at a predetermined pressure.

2. The system of claim 1 wherein said replenishing tank is a tank of a delivery truck and further comprising a coupling in circuit between the replenishing tank and the pump.

3. The system of claim 1 wherein said replenishing tank is a transfer tank that is fixed to the system.

4. The system of claim 1 wherein said means for detecting pressures within said bulk tank includes a pressure line in communication with a head space of said bulk storage tank and said means for automatically adjusting said flow control valve includes a pneumatic controller in communication with the pressure line and operatively engaging said flow control valve.

5. The system of claim 1 wherein said means for detecting pressures within said bulk storage tank includes a pressure sensor in communication with a head space of said bulk storage tank and said means for automatically adjusting said flow control valve includes a programmable controller in communication with the pressure sensor and an automatic actuator in communication with the programmable controller and operatively engaging said flow control valve.

6. The system of claim 5 wherein said programmable controller is also in communication with said pump and adjusts an operating speed of said pump based upon pressures detected within said bulk storage tank.

7. The system of claim 1 wherein said heat exchanger is an ambient heat exchanger.

8. The system of claim 1 wherein said heat exchanger and said by-pass line are positioned between said pump and said replenishing tank.

9. The system of claim 1 further comprising a dispensing line in communication with said bulk storage tank.

10. The system of claim 1 wherein said flow control valve is positioned within said by-pass line.

11. A system for conditioning cryogenic liquid comprising:
   a) a replenishing tank containing a supply of cryogenic liquid;
   b) a bulk storage tank;
   c) means for transferring the cryogenic liquid from the replenishing tank to the bulk storage tank;
   d) means for heating cryogenic liquid in circuit between the replenishing tank and the bulk storage tank;
   e) means for selectively directing a portion of the cryogenic liquid from the replenishing tank to the means for heating;
   f) means for mixing the heated cryogen with a remaining portion of the cryogenic liquid as it is transferred from the replenishing tank to the bulk storage tank; and
   g) means for detecting pressures within said bulk storage tank in communication with the means for selectively directing and adjusting the means for selectively directing based upon the pressures detected within the bulk storage tank so that the bulk storage tank is ultimately filled with saturated cryogenic liquid at a predetermined pressure.

12. The system of claim 11 wherein said means for detecting pressures within said bulk storage tank includes a pressure line in communication with ahead space of said bulk storage tank and said means for selectively directing includes a flow valve in parallel with the means for heating and a pneumatic controller in communication with the pressure line and operatively engaging said flow control valve.

13. The system of claim 11 wherein said means for detecting pressures within said bulk storage tank includes a pressure sensor in communication with a head space of said bulk storage tank and said means for selectively directing includes a flow valve in parallel with the means for heating, a programmable controller in communication with the pressure sensor and an automatic actuator in communication with the programmable controller and operatively engaging said flow control valve.

14. The system of claim 13 wherein said programmable controller is also in communication with said means for transferring.

15. The system of claim 11 wherein said means for heating is a heat exchanger.

16. The system of claim 11 further comprising a dispensing line in communication with said bulk storage tank.

17. The system of claim 11 wherein said means for transferring is a pump.

18. The system of claim 11 wherein said means for selectively directing is a flow control valve.

19. A method for conditioning cryogenic liquid and simultaneously transferring it from a replenishing tank to a bulk storage tank comprising the steps of:
   a) pumping the cryogenic liquid so that a stream of cryogenic liquid flowing from the replenishing tank to the bulk storage tank occurs;
   b) detecting a pressure within the bulk storage tank and communicating the pressure detected to a flow control valve;
   c) selectively heating a portion of the stream of cryogenic liquid based upon the pressure detected within the bulk storage tank so that heated cryogen is produced; and
   d) mixing the heated cryogen with a remaining portion of the stream so that a heated cryogenic liquid stream flows into the bulk storage tank thus increasing the pressure therein.

20. The method of claim 19 further comprising the step of temporarily placing the replenishing tank in communication with the bulk storage tank.

* * * * *